US008218028B2

(12) United States Patent
Izume et al.

(10) Patent No.: US 8,218,028 B2
(45) Date of Patent: Jul. 10, 2012

(54) IMAGING APPARATUS, IMAGE PROCESSING APPARATUS, AND PROGRAM

(75) Inventors: Rieko Izume, Osaka (JP); Yumi Sanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 12/128,904

(22) Filed: May 29, 2008

(65) Prior Publication Data

US 2009/0021596 A1  Jan. 22, 2009

(30) Foreign Application Priority Data

Jul. 18, 2007  (JP) ................. 2007-187145

(51) Int. Cl.
*H04N 5/235* (2006.01)
*G06K 9/00* (2006.01)
(52) U.S. Cl. .................. 348/229.1; 382/170
(58) Field of Classification Search ........... 348/222.1, 348/229.1, 230.1, 239; 382/170
See application file for complete search history.

(56) References Cited

U.S. PATENT DOCUMENTS

2005/0141002 A1* 6/2005 Takano et al. ............ 358/1.9

FOREIGN PATENT DOCUMENTS

| JP | 4-150692 | 5/1992 |
| JP | 2004-56416 | 2/2004 |
| JP | 2004-259177 | 9/2004 |
| JP | 2006-92137 | 4/2006 |

OTHER PUBLICATIONS

Office Action issued Jun. 7, 2011 in Japan Application No. 2007-187145.

* cited by examiner

*Primary Examiner* — David Ometz
*Assistant Examiner* — Dillon Durnford Geszvain
(74) *Attorney, Agent, or Firm* — Oblon, Spivak, McClelland, Maier & Neustadt, L.L.P.

(57) ABSTRACT

An imaging apparatus includes: determination means for determining whether a capture image is a frontlit image or a backlit image; detecting means for detecting a flesh-color area in the capture image; calculation means for setting weights, in a luminance histogram on the flesh-color area, on luminance of pixels included in a high-luminance area having a relatively high luminance value and luminance of pixels included in a low-luminance area having a relatively low luminance value in accordance with the determination result, and calculating modified luminance produced by modifying luminance on the flesh-color area on the basis of the weights; and correcting means for correcting brightness of the capture image on the basis of the modified luminance.

14 Claims, 9 Drawing Sheets

IMAGING APPARATUS, IMAGE PROCESSING APPARATUS, AND PROGRAM

CROSS REFERENCES TO RELATED APPLICATIONS

The present invention contains subject matter related to Japanese Patent Application JP 2007-187145 filed in the Japanese Patent Office on Jul. 18, 2007, the entire contents of which are incorporated herein by reference.

BACKGROUND OF THE INVENTION

1. Field of the Invention

The present invention relates to an image processing technique on a capture image.

2. Description of the Related Art

There are imaging apparatuses capable of detecting a person in a capture image, and adjusting the brightness of the capture image so as to give correct brightness to that person. For example, Japanese Unexamined Patent Application Publication No. 4-150692 has disclosed that a flesh-area of a person is detected and exposure adjustment is made so as to have correct exposure on the flesh-color area of the person.

SUMMARY OF THE INVENTION

However, there is a problem in that it is not possible to express a flesh-color area with correct brightness by such a technique in the case where there are various flesh-color areas.

For example, at the time of taking a picture in frontlighting, if a person at the front is bright and a building in brick in the background is relatively dark, the color of the brick in the background is sometimes recognized as flesh color in addition to the face of the person at the front. If the brick is darker than the person, the average value of the luminance of the flesh-color area including both the flesh-color area of the person and the flesh-color area of the brick becomes lower (darker) than the average value of only the flesh-color area of that person. In order to make such a dark area have a correct luminance value, a correction is made for increasing the luminance more than necessary. Accordingly, the flesh-color area of the person is corrected brighter than necessary. Thus, there is a problem in that over exposure might occur depending on the situation.

Also, in the case of backlighting, there is a problem in that the opposite phenomenon occurs, that is to say, a flesh-color area of a person is not corrected to have sufficient brightness. For details, for example, when a picture of a person is taken in backlighting against the background of a sand beach of a seashore, the background sand beach is sometimes recognized as a flesh color area in addition to that person. At this time, the average value of the luminance of both of the flesh-color areas becomes higher (brighter) than the average value of only the flesh-color of the person. In this case, in correcting the brightness of the image, brightness is increased less than originally necessary. Alternatively, the brightness is suppressed (corrected to decrease brightness). Thus, there is a problem in that the face of the person is expressed relatively dark.

It is therefore desirable to provide an imaging apparatus, an image processing apparatus, and the related techniques to these apparatuses that allow appropriately correcting the brightness of a flesh-color area of a person.

According to an embodiment of the present invention, there is provided an imaging apparatus including: determination means for determining whether a capture image is a frontlit image or a backlit image; detecting means for detecting a flesh-color area in the capture image; calculation means for setting weights, in a luminance histogram on the flesh-color area, on luminance of pixels included in a high-luminance area having a relatively high luminance value and luminance of pixels included in a low-luminance area having a relatively low luminance value in accordance with the determination result, and calculating modified luminance produced by modifying luminance on the flesh-color area on the basis of the weights; and correcting means for correcting brightness of the capture image on the basis of the modified luminance.

According to an embodiment of the present invention, there is provided an imaging apparatus including: determination means for determining whether a capture image is a frontlit image; detecting means for detecting a flesh-color area in the capture image; and when the capture image is determined to be a frontlit image, correction means for correcting brightness of the capture image such that a high-luminance area having a relatively high luminance value comes closer to a correct luminance value than a low-luminance area having a relatively low luminance value among the flesh-color area.

According to an embodiment of the present invention, there is provided an imaging apparatus including: determination means for determining whether a capture image is a backlit image; detecting means for detecting a flesh-color area in the capture image; and when the capture image is determined to be a backlit image, correction means for correcting brightness of the capture image such that a low-luminance area having a relatively low luminance value comes closer to a correct luminance value than a high-luminance area having a relatively high luminance value among the flesh-color area.

According to an embodiment of the present invention, there is provided an image processing apparatus including: determination means for determining whether a capture image is a frontlit image or a backlit image; detecting means for detecting a flesh-color area in the capture image; calculation means for setting weights, in a luminance histogram on the flesh-color area, on luminance of pixels included in a high-luminance area having a relatively high luminance value and luminance of pixels included in a low-luminance area having a relatively low luminance value in accordance with the determination result, and calculating modified luminance produced by modifying luminance on the flesh-color area on the basis of the weights; and correcting means for correcting brightness of the capture image on the basis of the modified luminance.

According to an embodiment of the present invention, there is provided an image processing apparatus including: determination means for determining whether a capture image is a frontlit image; detecting means for detecting a flesh-color area in the capture image; and when the capture image is determined to be a frontlit image, correction means for correcting brightness of the capture image such that a high-luminance area having a relatively high luminance value comes closer to a correct luminance value than a low-luminance area having a relatively low luminance value among the flesh-color area.

According to an embodiment of the present invention, there is provided an image processing apparatus including: determination means for determining whether a capture image is a backlit image; detecting means for detecting a flesh-color area in the capture image; and when the capture image is determined to be a backlit image, correction means for correcting brightness of the capture image such that a low-luminance area having a relatively low luminance value comes closer to a correct luminance value than a high-luminance area having a relatively high luminance value among the flesh-color area.

According to an embodiment of the present invention, there is provided a program for causing a computer to perform processing including the steps of: a) determining whether a capture image is a frontlit image or a backlit image; b) detecting a flesh-color area in the capture image; c) setting weights, in a luminance histogram on the flesh-color area, on luminance of pixels included in a high-luminance area having a relatively high luminance value and luminance of pixels included in a low-luminance area having a relatively low luminance value in accordance with the determination result, and calculating modified luminance produced by modifying luminance on the flesh-color area on the basis of the weights; and d) correcting brightness of the capture image on the basis of the modified luminance.

According to an embodiment of the present invention, there is provided a program for causing a computer to perform processing including the steps of: a) determining whether a capture image is a frontlit image; b) detecting a flesh-color area in the capture image; and c) when the capture image is determined to be a frontlit image, correcting brightness of the capture image such that a high-luminance area having a relatively high luminance value comes closer to a correct luminance value than a low-luminance area having a relatively low luminance value among the flesh-color area.

According to an embodiment of the present invention, there is provided a program for causing a computer to perform processing including the steps of: a) determining whether a capture image is a backlit image; b) detecting a flesh-color area in the capture image; and c) when the capture image is determined to be a backlit image, correcting brightness of the capture image such that a low-luminance area having a relatively low luminance value comes closer to a correct luminance value than a high-luminance area having a relatively high luminance value among the flesh-color area.

By the present invention, it is possible to correct a flesh-color area of a person to have correct brightness.

DESCRIPTION OF THE PREFERRED EMBODIMENTS

In the following, a description will be given of embodiments of the present invention with reference to the drawings.

1. First embodiment 1-1. Schematic Configuration

Figure 1:
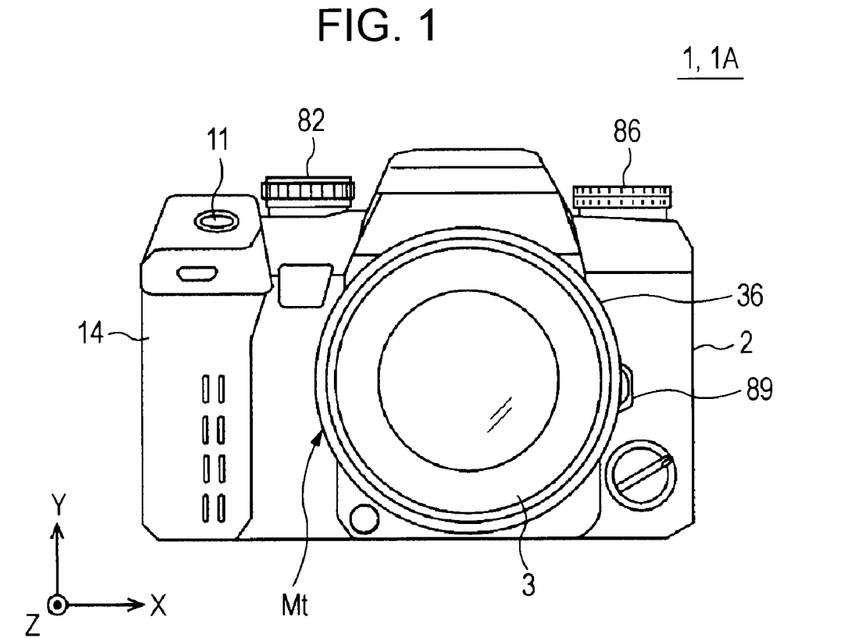
FIG. 1 is an outer front view of an imaging apparatus.
Figure 2:
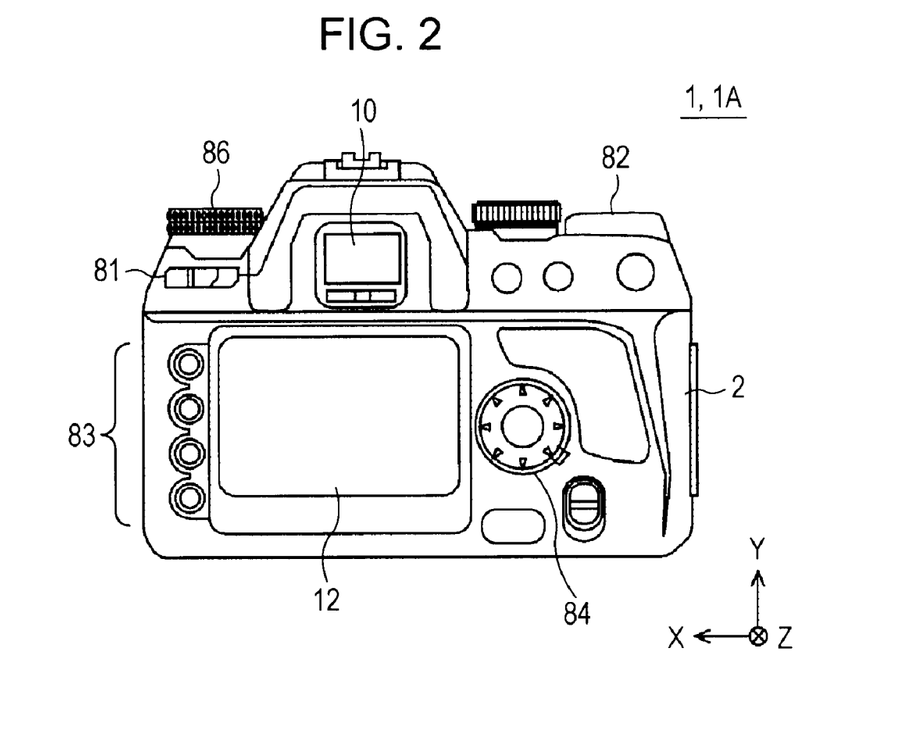
FIG. 2 is an outer back view of the imaging apparatus.

FIGS. 1 and 2 illustrate an outer configuration of an imaging apparatus 1 (1A) according to a first embodiment of the present invention. Here, FIG. 1 is an outer front view of the imaging apparatus 1, and FIG. 2 is an outer back view of the imaging apparatus 1. The imaging apparatus 1 is a digital camera of a single-lens reflex type with interchangeable lenses. In this regard, the imaging apparatus 1 is also described as an image processing apparatus performing image processing described below.

As shown in FIG. 1, the imaging apparatus 1 includes a camera main unit (camera body) 2. An interchangeable capture-lens unit (interchangeable lenses) 3 is detachably mounted on the camera main unit 2.

The capture-lens unit 3 mainly includes a camera cone 36, a lens group 37 (refer to FIG. 3) disposed inside the camera cone 36, an aperture, etc. The lens group 37 (image-capture optical system) includes a focus lens, etc., which changes a focal length by being moved in an optical axis direction.

The camera main unit 2 is provided with a circular-ring mount section Mt, to which the capture-lens unit 3 is mounted, substantially in the center of the front side, and is provided with a detachment button 89 for detaching the capture-lens unit 3 near the circular-ring mount section Mt.

Also, the camera main unit 2 is provided with a mode-setting dial 82 at the upper left of the front side, and a control-value-setting dial 86 at the upper right of the front side. By operating the mode-setting dial 82, it is possible to set various modes of the camera (including various shooting modes (a person-shooting mode, a scenery-shooting mode, a full-automatic shooting mode, etc.), a reproducing mode reproducing a captured image, a communication mode exchanging data with an external apparatus, etc.). Also, by operating the control-value-setting dial 86, it is possible to set control value at various shooing modes.

Also, the camera main unit 2 is provided with a grip section 14 for a photographer to hold the camera at the leftmost part on the front side. The upper surface of the grip section 14 is provided with a release button 11 for instructing a start of exposure. A battery chamber and a card storage section are disposed in the grip section 14. The battery chamber accommodates, as a power source of the camera, for example, a lithium-ion battery. The card storage section detachably accommodates a memory card 90 (refer to FIG. 3) for recording image data of a capture image.

The release button 11 is a two-step detection button capable of detecting two states, a half-pressed state (S1 state) and a full-pressed state (S2 state). When the release button 11 is half pressed to go into the S1 state, a preparatory operation (for example, an AF control operation, an AE control operation, etc.) for obtaining a still image (an actual capture image) on an object for recording is performed. Also, when the release button 11 is further pressed to go into the S2 state, shooting operation (a series of operations including the exposure operation on the object image (optical image of the object) using an imaging device 5 (described below) is performed, and predetermined image processing is performing on the image signal obtained by the exposure operation) of the actual capture image is performed.

In FIG. 2, a finder window (eyepiece window) 10 is disposed at a substantially upper central part on the backside of the camera main unit 2. By viewing through the finder window 10, a photographer can view the optical image of an object guided from the capture-lens unit 3, and determine composition. That is to say, it is possible to determine the composition using the optical finder.

In FIG. 2, a backside monitor 12 is disposed at a substantially central part on the backside of the camera main unit 2. The backside monitor 12 includes, for example, a color liquid-crystal display (LCD). The backside monitor 12 can display a menu screen for setting shooting conditions, etc., and reproduce to display the capture images recorded on the memory card 90 in the reproducing mode.

A main switch 81 is disposed at the upper left part of the backside monitor 12. The main switch 81 is a two-position slide switch. When the contact point is set to a left position, "OFF" position, the power is turned off, and when the contact point is set to a right position, "ON" position, the power is turned on.

A direction-selection key 84 is disposed at the right side of the backside monitor 12. This direction-selection key 84 has a circular operation button, and can detect a pressing operation in four directions, up, down, right, and left, and in four other directions, upper right, upper left, lower right, and lower left. In this regard, the direction-selection key 84 can also detect a pressing operation of the central push button in addition to the pressing operation in the eight directions described above.

A setting button group 83 including a plurality of buttons is disposed at the left side of the backside monitor 12 in order to set a menu screen, to delete an image, and the like.

1-2. Functional Blocks

Figure 3:
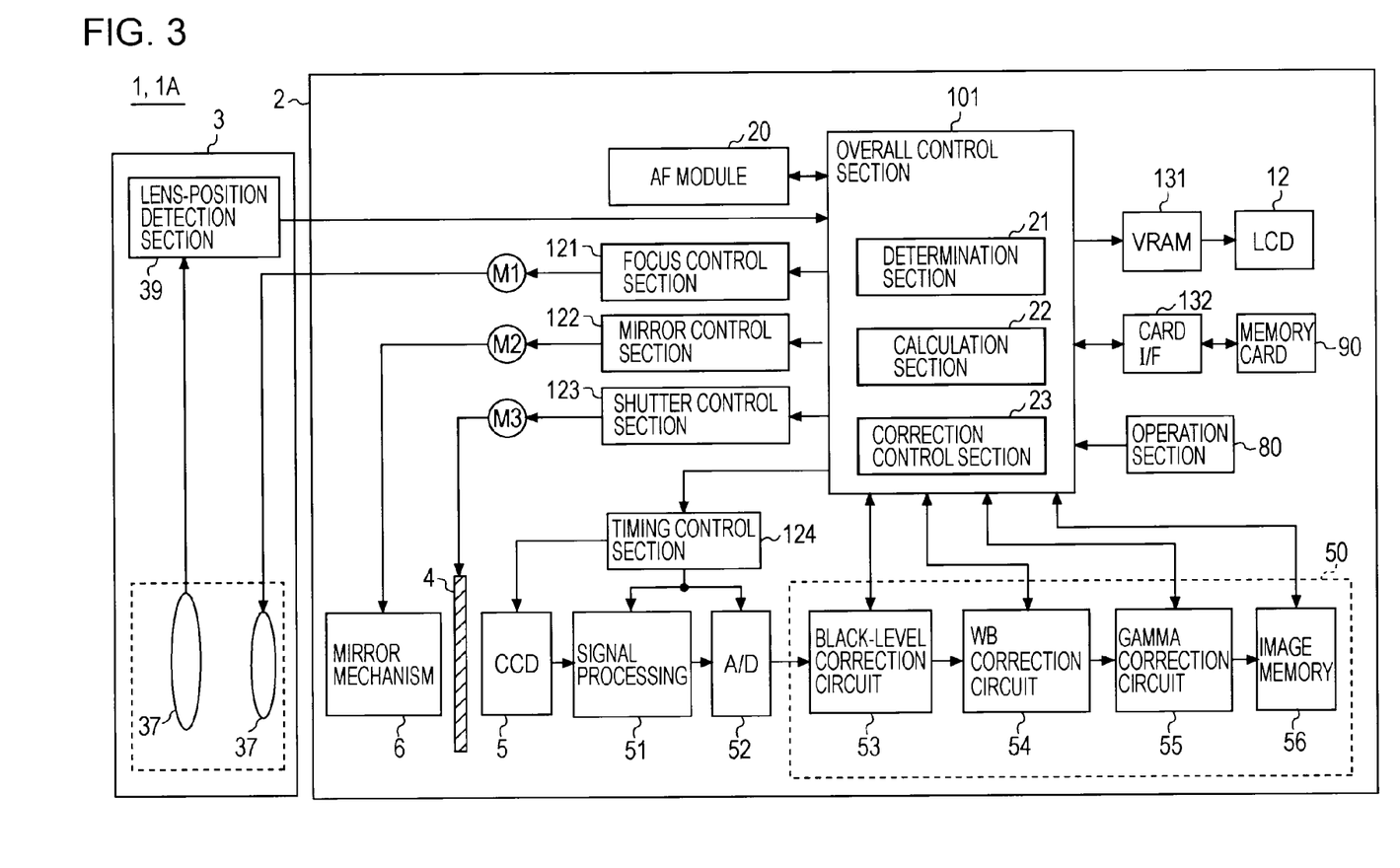
FIG. 3 is a block diagram illustrating a functional configuration of the imaging apparatus.

Next, a description will be given of an overview of the functions of the imaging apparatus 1 with reference to FIG. 3. FIG. 3 is a block diagram illustrating a functional configuration of the imaging apparatus 1.

As shown in FIG. 3, the imaging apparatus 1 includes an operation section 80, an overall control section 101, a focus control section 121, a mirror control section 122, a shutter control section 123, a timing control section 124, a digital-signal processing circuit 50, etc.

The operation section 80 includes various buttons including a release button 11 (refer to FIG. 1), switches, and the like. The overall control section 101 performs various operations in response to an input operation of the user on the operation section 80.

The overall control section 101 is constituted by a microcomputer, and mainly includes a CPU, a memory, and a ROM. The overall control section 101 reads programs stored in the ROM, and executes the programs by the CPU, thereby achieving various functions.

For example, the overall control section 101 performs each processing section including a determination section 21, a calculation section 22, and a correction control section 23. The determination section 21 determines whether a capture image is a frontlit image or a backlit image. The calculation section 22 sets weights, in a luminance histogram on the flesh-color area, on the luminance of pixels included in a relatively high luminance area (high-luminance area) and the luminance of pixels included in a relatively low luminance value (low-luminance area) in accordance with the determination result of the determination section 21, and calculates "modified luminance" produced by modifying the luminance on the flesh-color area on the basis of the weights. Also, the correction control section 23 corrects the brightness of the capture image on the basis of the "modified luminance" using a gamma correction circuit 55, etc. The overall control section 101 performs the detection operation of the flesh-color area described below and the luminance adjustment operation, etc., based on the detection result using these processing sections.

Also, the overall control section 101 cooperates with an AF module 20 and the focus control section 121, etc., in performing focus control operation controlling a focus-lens position. The overall control section 101 performs the AF operation using the focus control section 121 in accordance with the focus state of an object detected by the AF module 20. In this regard, the AF module 20 can detect the focus state of the object by a method of detecting a focus state, such as a phase-difference method, etc., using light entered through a mirror mechanism 6.

The focus control section 121 generates a control signal on the basis of the signal input from the overall control section 101 to drive a motor M1, thereby moving the focus lens included in the lens group 37 of the capture-lens unit 3. Also, the position of the focus lens is detected by a lens-position detection section 39 of the capture-lens unit 3, and the data indicating the position of the focus lens is sent to the overall control section 101. In this manner, the focus control section 121, the overall control section 101, etc., controls the movement of the focus lens in the optical axis direction.

The mirror control section 122 controls the status switching between a retreated state (mirror-up state) of the mirror mechanism 6 from the light path and a block state (mirror-down state) of the light path by the mirror mechanism 6. The mirror control section 122 generates a control signal on the basis of the signal input from the overall control section 101 to drive a motor M2, thereby switching the state between the mirror-up state and the mirror-down state.

The shutter control section 123 generates a control signal on the basis of the signal input from the overall control section 101 to drive a motor M3, thereby controlling the opening and the closing of the shutter 4.

The timing control circuit 124 controls the timing of the imaging device 5, etc.

The imaging device (here, a CCD sensor (simply called a CCD)) 5 converts a light image of an object into an electrical signal by photoelectric conversion effect, and generates an image signal (recording image signal) related to the capture image. The imaging device 5 is also expressed as an imaging device for acquiring a recording image.

The imaging device 5 performs exposure of an object image formed on a light-receiving surface in response to a drive control signal (storage-start signal and storage-end signal) input from the timing control signal 124, and generates an image signal related to the object image. Also, imaging device 5 outputs the image signal to a signal processing section 51 in response to the read control signal input from the timing control circuit 124. Also, the timing signal (synchronization signal) from the timing control circuit 124 is also input into the signal processing section 51 and an A/D (analog/digital) conversion circuit 52.

The image signal acquired by the imaging device 5 is subjected to predetermined analog signal processing by the signal processing section 51. The image signal after having been subjected to the analog signal processing is converted into digital image data (image data) by the A/D conversion circuit 52. This image data is input into a digital-signal processing circuit 50.

The digital-signal processing circuit 50 performs digital-signal processing on the image data input from the A/D conversion circuit 52, and generates the image data related to the capture image. The digital-signal processing circuit 50 includes a black-level correction circuit 53, a white-balance (WB) circuit 54, a gamma correction circuit 55, and an image memory 56.

The black-level correction circuit 53 corrects the black level of each pixel data included in the image data output by the A/D conversion circuit 52 to a reference black level. The WB circuit 54 adjusts the white balance of the image. The gamma correction circuit 55 performs grayscale conversion of the capture image. The image memory 56 is an image memory capable of accessing at a high speed for temporarily storing the generated image data, and has a capacity allowing the storage of image data of a plurality of frames.

At the time of actual shooting, the image data temporarily stored in the image memory 56 is subjected to appropriate image processing (including compression processing, etc.) by the overall control section 101, and then is stored into the memory card 90 through the card I/F 132.

Also, the image data temporarily stored in the image memory 56 is appropriately transferred to a VRAM 131 by the overall control section 101, and the image based on the image data is displayed onto the backside monitor 12. Thus, confirmation display (after view) for confirming a capture image, reproducing display for reproducing captured images, etc., are performed.

1-3. Shooting Operation

Figure 4:
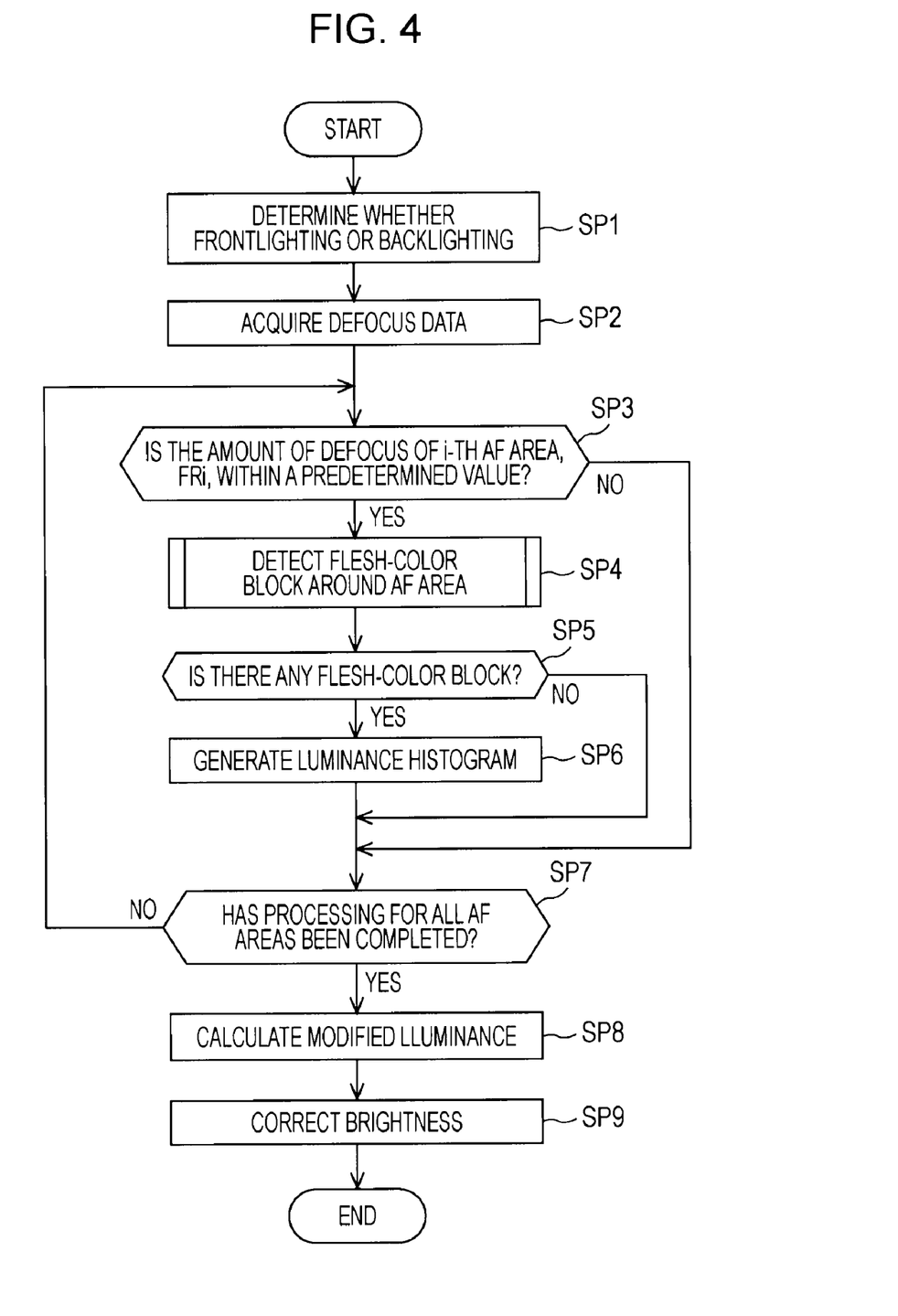
FIG. 4 is a flowchart illustrating an operation immediately after a shooting operation.

A description will be given of the operation of the imaging apparatus 1 with reference to FIG. 4. FIG. 4 is a flowchart illustrating the operation immediately after the shooting operation of the imaging apparatus 1.

When the release button 11 is pressed to the full-pressed state S2 to give a shooting instruction, the imaging apparatus 1 releases the shutter 4 for a predetermined exposure time, and acquires the image data on the object of shooing using the imaging device 5. Next, the imaging apparatus 1 performs luminance adjustment processing described below, etc., on the image data. As a result, the image data having been subjected to the luminance adjustment processing, etc., is generated as the actual capture image to be recorded onto the memory card 90. In the following, a description will be given of the operation from the state in which an exposed image (image data) acquired by the imaging device 5 has been temporarily read into the image memory 56 to the state of having been recorded onto the memory card 90 with a central focus on the operation related to the luminance adjustment.

Figure 5:
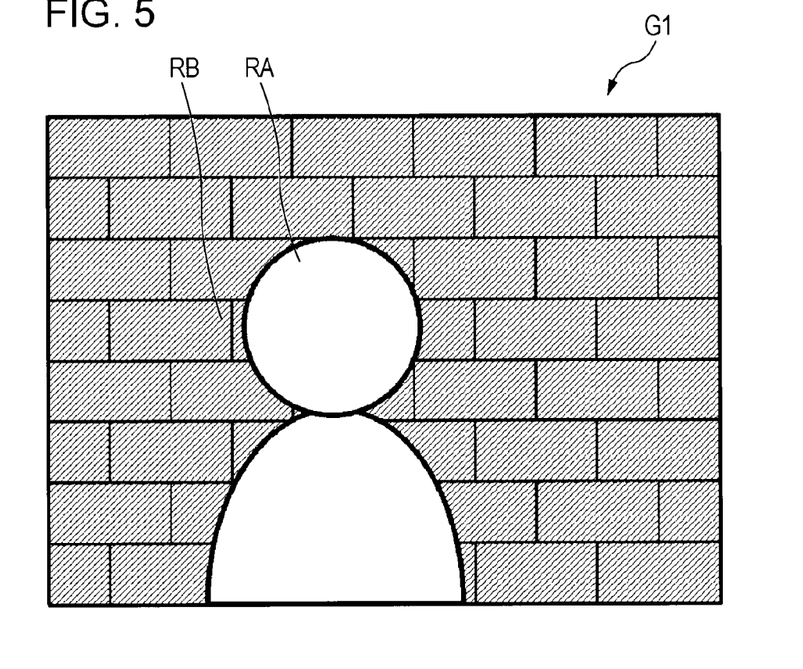
FIG. 5 is a diagram illustrating an example of a capture image (frontlit image)

Here, assume the situation of capturing an image G1 as shown in FIG. 5. Specifically, the image G1 is captured in frontlighting, and a person at the front is bright and a building in brick in the background is relatively dark.

First, in step SP1, a determination is made on whether the capture image G1 is taken in frontlighting (also called a "frontlit image") or not, and a determination is made on whether the capture image G1 is taken in backlighting (also called a "backlit image") or not.

Figure 6:
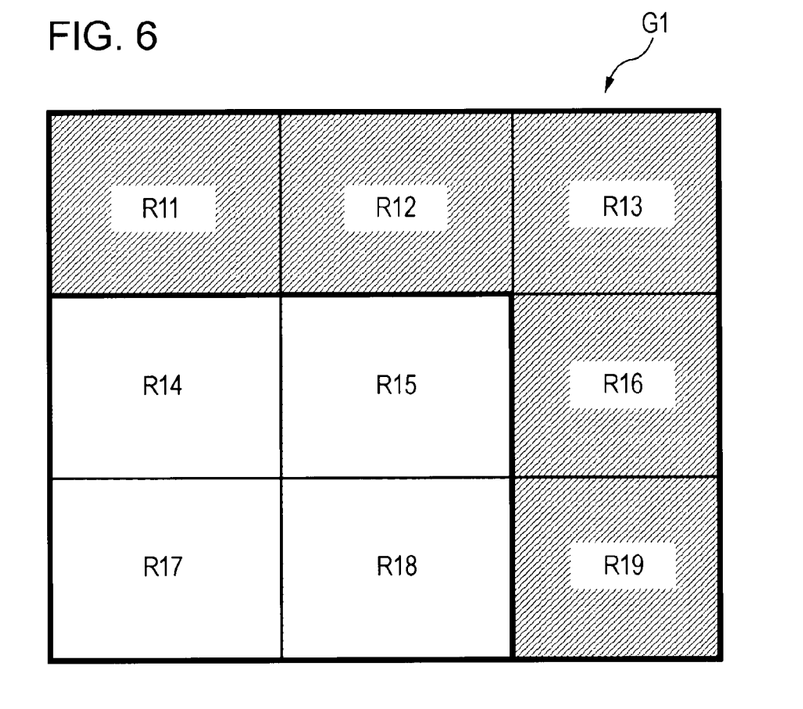
FIG. 6 is a diagram illustrating a partitioned area on the capture image.

To describe in detail, as shown in FIG. 6, the capture image G1 is divided into three equal parts both in a vertical direction and in a horizontal direction, and thus is divided into nine pieces of areas R11 to R19 in total. Next, the brightness of each of the areas R11 to R19 is obtained. A determination is made on whether the capture image G1 is a frontlit image or a backlit image. For example, in the capture image G1, if the three upper areas R11 to R13 and right areas R16 and R19, five areas in total, are relatively dark, and one of the other areas R14, R15, R17, and R18 is relatively bright, the capture image G1 is determined to be a frontlit image. Also, on the contrary, in the capture image G1, if the three upper areas R11 to R13 and right areas R16 and R19, five areas in total, are relatively bright, and one of the other areas R14, R15, R17, and R18 is relatively dark, the capture image G1 is determined to be a backlit image.

In step SP1, it is further preferable to obtain a degree of frontlighting or a degree of backlighting. Specifically, it is possible to determine the difference between the average luminance of the brightest area and the average luminance of the darkest area (specifically, the absolute value of the difference) to be an index value indicating the degree of frontlighting or the degree of backlighting. For example, the index value increases as the difference between both of the average luminance increases, and thus the degree of frontlighting or the degree of backlighting increases.

In the next steps SP2 to SP7, an AF area having a smaller amount of defocus of the image G1 at shooting time than a predetermined threshold value is selected among a plurality of AF areas, Fri (here, four AF areas FR1 to FR4) of the imaging apparatus 1. Next, detection processing of a flesh-color area, etc., is performed only on a block Bj (described below) around the selected AF area.

Thus, the image information around an AF area which is close to be in a focused state is used for the luminance adjustment operation among the entire screen. For example, for the image G1 in FIG. 5, the image information around a single AF area, FR3 (FIG. 8), or the image information around the three AF areas, FR1 to FR3, etc., is used. A picture is often taken by setting a person to be in focus as a main object of shooting. Thus, if the image information around the AF area which is nearly in focus is used, it is possible to correctly extract a person.

To describe in detail, first in step SP2, the amount of defocus (the amount of shift from a position in focus of the focus-lens position) in each of a plurality of AF areas, Fri disposed by the AF module 20 is obtained. Next, in step SP3, if it is determined that the amount of defocus of AF area, FRi, is less than a predetermined threshold value among a plurality of AF areas, the processing proceeds to steps SP4 to SP6. In other cases, the processing of steps SP4 to SP6 is not executed, and determination processing on the next AF area is executed.

In step SP4, a flesh-color area around the AF area, Fri is detected.

Figure 7:
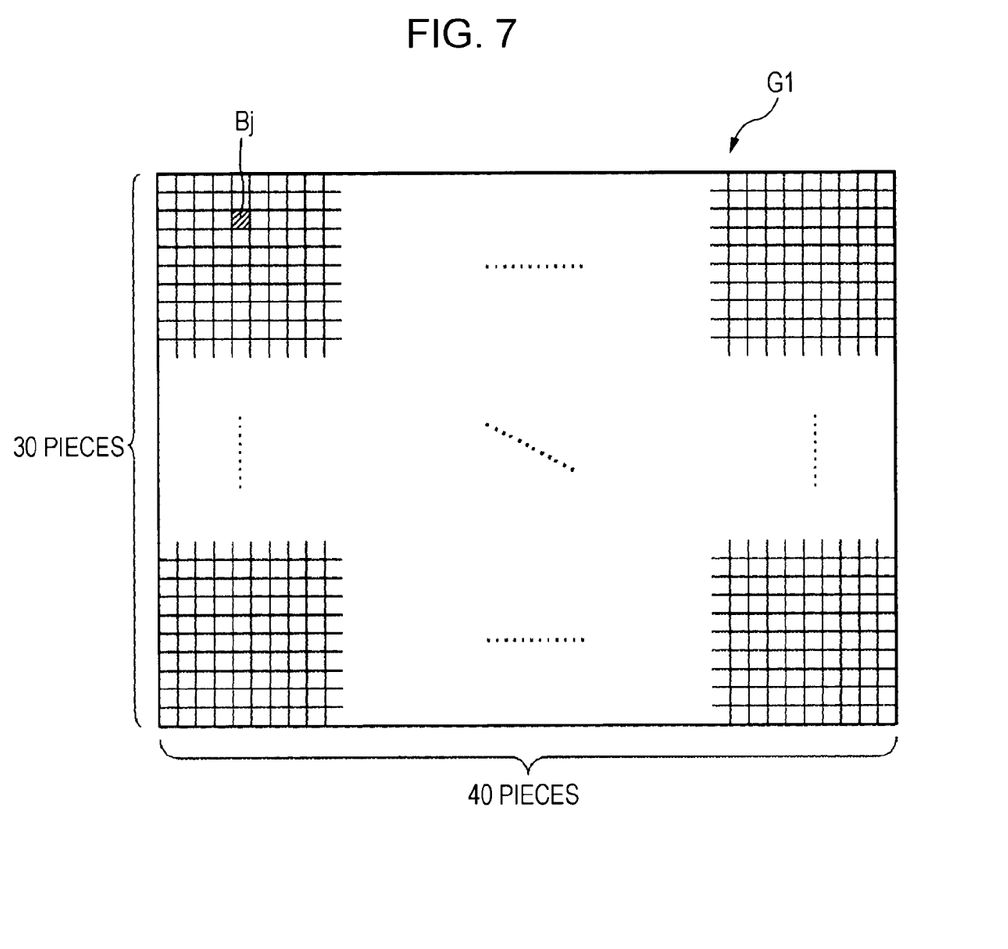
FIG. 7 is a diagram illustrating a plurality of blocks in the capture image.

FIG. 7 is a diagram illustrating a plurality of blocks Bj in the image G1. The image G1 is partitioned into 40 pieces in the horizontal direction and 30 pieces in the vertical direction, namely, partitioned into 1200 pieces of small areas (block Bj).

Figure 8:
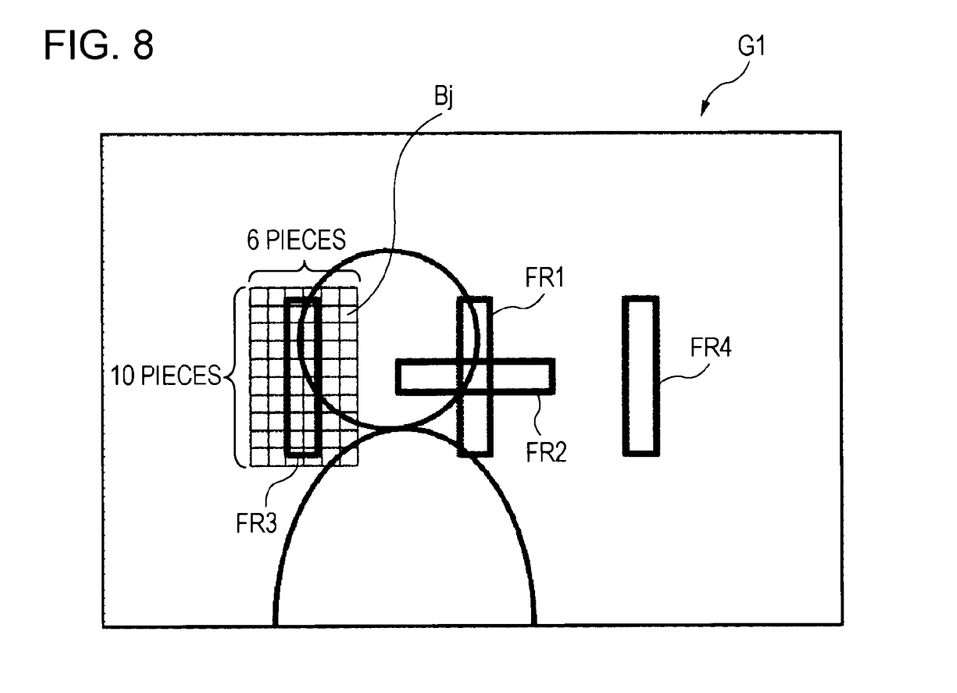
FIG. 8 is a diagram illustrating the blocks to be selected around an AF area.

First, the blocks around the AF area, Fri, are selected as blocks to be processed among these 1200 pieces of blocks Bj. For example, as shown in FIG. 8, a plurality of blocks around the AF area FR3 (60 pieces of blocks that are disposed 6 pieces in the horizontal direction and 10 pieces in the vertical direction) are selected.

Figure 9:
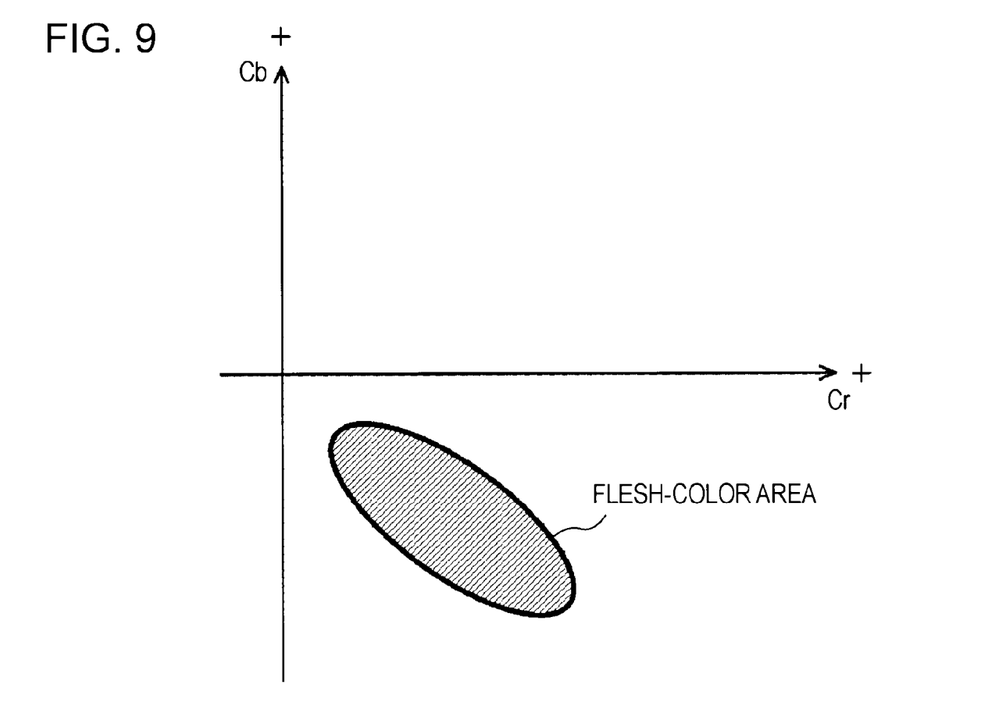
FIG. 9 is a diagram illustrating a flesh-color area in a color space.

Next, blocks whose color is classified as flesh color (also called "flesh-color blocks") are further extracted among the selected 60 pieces of blocks Bj. Specifically, first, the pixel values of RGB components of each pixel in the block Bj are converted into a luminance value Y and color components Cr and Cb. If the color components Cr and Cb of each pixel in the block Bj after conversion are positioned in a predetermined range (flesh-color area) representing flesh color in the Cr-Cb space as shown in FIG. 9, the pixel is determined to be a flesh-color pixel. Furthermore, if such flesh-color pixels occupy over a predetermined ratio (for example, 80%) in a certain block Bj, the block Bj is determined to be a flesh-color block. However, the determination is not limited to this, and the color of the block Bj may be determined by the color of one or a plurality of representative pixels in the block Bj.

In this manner, if a flesh-color block Bj is extracted, the processing proceeds from step SP5 to step SP6. On the other hand, if a flesh-color block Bj is not extracted at all, the processing proceeds from step SP5 to step SP7.

In step SP6, a luminance histogram on the flesh-color blocks Bj is generated. To describe in detail, the histogram (frequency distribution) of the luminance value Y is obtained on the basis of the luminance of each of the plurality of pixels in the flesh-color block Bj.

Figure 10:
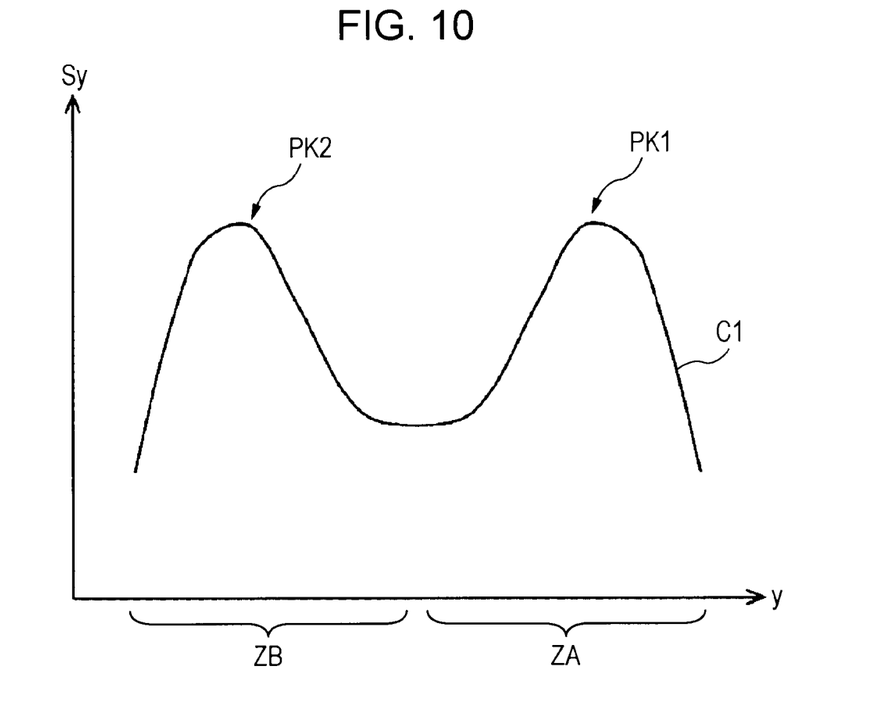
FIG. 10 is a diagram illustrating a luminance histogram.

For example, when the image G1 as shown in FIG. 5 is captured, in addition to the block Bj corresponding to a bright flesh-color area of the person, the block Bj corresponding to the background brick portion is also determined to be a "flesh-color block". FIG. 10 is a diagram illustrating a histogram curve C1 of the luminance value Y in such a case. As shown in FIG. 10, two peaks PK1 and PK2 appear in the histogram curve C1. The peak PK1 in a relatively bright part corresponds to a flesh-color area of a face of the person, and the peak PK2 in a relatively dark part corresponds to a flesh-color area of the background brick.

After that, in step SP7, a determination is made on whether the processing for all the AF areas Fri has been completed. If there is an unprocessed AF area Fri, the processing returns to step SP3 again, and if there is no unprocessed AF area Fri, the processing proceeds to step SP8.

In this regard, the above-described processing of step SP6 is executed on the blocks Bj in the vicinity of all the AF areas Fri having a small amount of defocus, and thus a luminance histogram on the flesh-color blocks is obtained.

In step SP8, a "modified luminance" is calculated on the flesh-color blocks using such a luminance histogram. Specifically, the luminance value of each pixel is modified on the selected flesh-color blocks Bj using a weighting factor for each luminance value Y. A modified luminance value YMave, which is the average value of the luminance values YM of each of the pixels after the modification is calculated as a "modified luminance".

Figure 11:
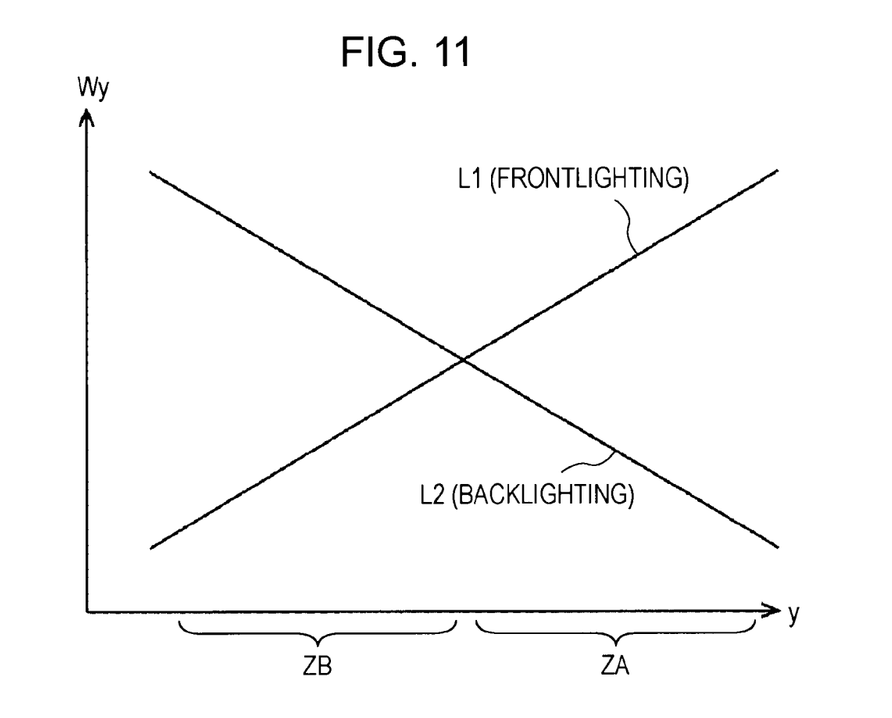
FIG. 11 is a diagram illustrating a weighting curve.

FIG. 11 is a diagram illustrating a weighting curve L1 indicating a weighting factor Wy of each luminance value y, etc. For example, if a capture image is determined to be a frontlit image in step SP1, the curve L1 is employed as a weighting curve.

Next, the modified luminance value YMave is obtained using the following expression (1).

[Expression 1]

$$YM_{ave} = \frac{\sum_{y=0}^{255}(y \cdot Wy \cdot Sy)}{\sum_{y=0}^{255}(Wy \cdot Sy)} \quad (1)$$

Here, Wy represents a weighting factor of each luminance value y, and Sy represents the number (frequency) of pixels having each luminance value y.

The weighting curve L1 has a characteristic in which a weight on the luminance value of a high-luminance area ZA (refer to FIGS. 10 and 11) having a relatively high luminance value is relatively large, and a weight on the luminance value of a low-luminance area ZB having a relatively low luminance value is relatively small. Also, the modified luminance value YMave using the weight Wy by the curve L1 becomes a greater value than an average value (the average luminance value before modification) Yave of the luminance values Y before modification.

In this manner, a calculation is made of the modified luminance value YMave produced by modifying the luminance on the flesh-color area on the basis of the weights set in accordance with the determination result of being in the frontlighting state. Specifically, the modified luminance value YMave is calculated such that a weight on the high-luminance area ZA is set larger than the weight on the low-luminance area ZB, and the modified luminance value YMave is calculated so as to be greater than the average luminance value Yave on the flesh-color area before modification.

In the next step SP9, the brightness of the capture image G1 is corrected on the basis of the obtained modified luminance value YMave. Specifically, the brightness of the capture image G1 is corrected such that the modified luminance value YMave becomes a correct luminance value. More specifically, a gamma correction curve which makes the modified luminance value YMave of the flesh-color block approximate a target value YT is employed, and the gamma correction based on that gamma correction curve is performed.

Figure 12:
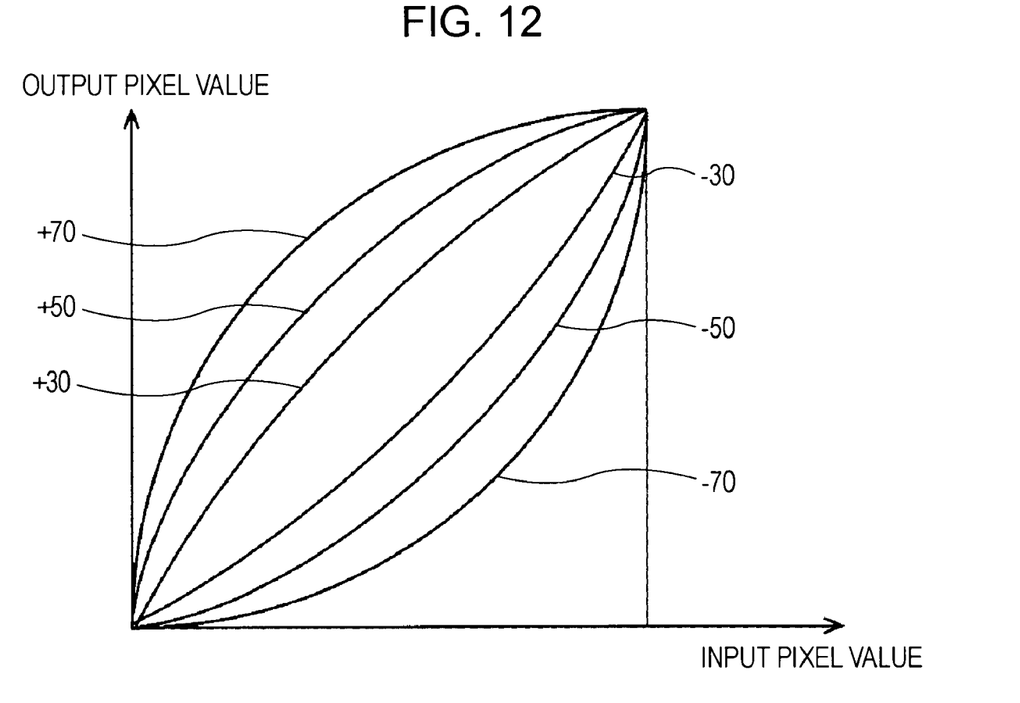
FIG. 12 is a diagram illustrating gamma correction curves.

FIG. 12 is a diagram illustrating a plurality of gamma correction curves. "+30", "+50", and "+70" are curves that increase the luminance (brightness) of the entire image, and "−30", "−50", and "−70" are curves that decrease the luminance (brightness) of the entire image. Also, the figure shows that the greater the numeric value after the positive sign and the negative sign is, the greater the degree of the correction by the curve becomes.

In step SP9, for example, in order to make the modified luminance value YMave (value 70) become the target value YT (value 120), a gamma correction curve which increases the average value by about 50 ("+50") is employed.

In this manner, the brightness of the capture image is corrected on the basis of the modified luminance value YMave.

Here, assuming that a technique of correcting the brightness of a capture image on the basis of an average luminance value Yave before modification is tentatively a comparative example, a comparison is made with the above-described embodiment.

In the case of the comparative example, assuming that the average luminance value Yave before modification is 50, a gamma correction curve which increases the average value by about 70 ("+70") is employed in order to make the average luminance value Yave approximate a target value YT. In this case, as described above, a correction is made to increase the luminance more than necessary. Over exposure might occur depending on the situation.

In contrast, by the above-described embodiment, weights are set, in a luminance histogram on the flesh-color area, on luminance of pixels included in a high-luminance area ZA and luminance of pixels included in a low-luminance area ZB in accordance with the determination result on whether in frontlighting or backlighting. The brightness of the capture image is corrected on the basis of the "modified luminance" calculated on the basis of the weights. Specifically, when the capture image is determined to be in frontlighting, the modified luminance is calculated using the curve L1 and the expression (1). In this case, the modified luminance is produced to become greater than the original luminance. For example, the modified luminance value YMave is obtained as a larger value (70) than the average luminance value Yave before modification (=50). Next, the capture image G1 is subjected to the correction of a relatively small degree of brightness using the gamma correction curve of "+50" rather than "+70" in order to make modified luminance value YMave become the correct luminance value YT. Accordingly, compared with the above-described comparative example, it is possible to prevent a flesh-color area in a frontlit image from having too much luminance, and to make the flesh-color area RA of the person have correct brightness.

In this regard, such an embodiment can be stated that if a capture image is determined to be a frontlit image, the brightness of the capture image is corrected such that a high-luminance area (for example, the flesh-color area RA of the person in FIG. 5) having a relatively high luminance comes closer to a correct luminance value than a low-luminance area (for example, the flesh-color area RB of bricks in FIG. 5) having a relatively low luminance among the flesh-color area.

1-4. Correction Processing on Backlit Image

Also, in this embodiment, when a capture image is a backlit image, the following operation is performed. In the following, a description will be mainly given of different points from the case of a capture image being a frontlit image.

Figure 13:
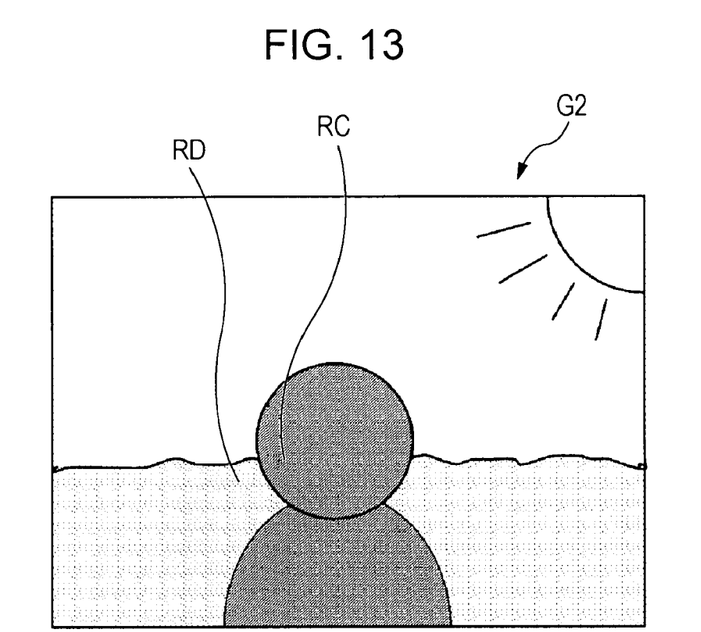
FIG. 13 is a diagram illustrating an example of a capture image (backlit image)

Here, assume the situation of capturing an image G2 as shown in FIG. 13. Specifically, the image G2 is captured of a person in backlighting at a seashore (sand beach).

First, in step SP1, the capture image G2 is determined to be in backlighting.

Also, in step SP8, a curve L2 (FIG. 11) is employed as a weighting curve. The weighting curve L2 has a characteristic in which a weight on the luminance value of a high-luminance area ZA (refer to FIG. 10) having a relatively high luminance value is relatively small, and a weight on the luminance value of a low-luminance area ZB having a relatively low luminance value is relatively large. Also, the modified luminance value YMave (for example, 70) using the weight Wy by the curve L2 becomes a lower value than an average value luminance Yave (for example, 90) before modification.

In the next step SP9, the brightness of the image G2 is corrected on the basis of the obtained modified luminance value YMave.

In step SP9, for example, in order to make the modified luminance value YMave (value 70) become the target value YT (value 120), a gamma correction curve which increases the average value by about 50 ("+50") is employed.

In this manner, the brightness of the capture image is corrected on the basis of the modified luminance value YMave.

Here, assuming that a technique of correcting the brightness of a capture image on the basis of an average luminance value Yave before modification is tentatively a comparative example, a comparison is made with the above-described embodiment.

In the case of the comparative example, assuming that the average luminance value Yave before modification is 90, a gamma correction curve which increases the average value by about 30 ("+30") is employed in order to make the average luminance value Yave approximate a target value YT (120). In this case, a correction is not made for the flesh-color area RC (refer to FIG. 13) of the person to have sufficient brightness. That is to say, there is a problem in that the brightness is not increased by a smaller amount than the amount originally necessary.

In contrast, by the above-described embodiment, when the capture image is determined to be a backlit image, the modified luminance YMave is calculated using the curve L2 and the expression (1). Thus, the modified luminance value YMave (for example, value 70) is corrected to a smaller value than the average luminance value Yave before modification (for example, 90). Next, the capture image G2 is subjected to the correction of a relatively large degree of brightness using the gamma correction curve of "+50" rather than "+30" in order to make the modified luminance value YMave become the correct luminance value (YT=120). Accordingly, it is possible to correct a relatively dark flesh-color area of the person in a backlit image to have sufficient brightness, and to make the flesh-color area RC of the person have correct brightness.

Also, such an embodiment can be stated that if a capture image is determined to be a backlit image G2, the brightness of the capture image is corrected such that a low-luminance area (for example, the flesh-color area RC of the person in FIG. 13) having a relatively low luminance value comes closer to a correct luminance value than a high-luminance area (for example, the flesh-color area RD of sand beach in FIG. 13) having a relatively high luminance value among the flesh-color areas.

In this regard, in this embodiment, a determination is made on whether the capture image is a frontlit image or a backlit image, and a determination is made on which of the curves L1 and L2 to be employed on the basis of the determination result. However, the present invention is not limited to this. For example, the degree of modification of the luminance of a flesh-color area may further be changed in accordance with the degree of frontlighting and/or the degree of backlighting. Specifically, if the degree of frontlighting is small, the slope of the curve L1 against the horizontal direction may be small. Also, if the degree of backlighting is small, the slope of the curve L2 against the horizontal direction may be small. That is to say, a weighting curve having a gentle slope may be used. Alternatively, on the contrary, if the degree of frontlighting or backlighting is large, a weighting curve having a further steep slope may be used. Next, the modified luminance may be calculated using a weighting curve modified in accordance with the degree of frontlighting or backlighting, and the brightness of the capture image may be corrected on the basis of the modified luminance.

Also, if the capture image is a frontlit image G1 when the brightness of the capture image G1 is corrected such that the average luminance value YMave obtained on the basis of the expression (1) and the curve L1 becomes the correct luminance value as the first embodiment, the following advantages can be further obtained.

In the first embodiment, it is assumed that the capture image G1 (refer to FIGS. 5 and 10) has two peaks PK1 and PK2 in the high-luminance area ZA and the low-luminance area ZB, respectively, of the pixel luminance of the flesh-color area. However, in reality, there are capture images having a single peak (for example, only the peak PK1 in the high-luminance area ZA, or only the peak PK2 in the low-luminance area ZB) of the pixel luminance of the flesh-color area. In this regard, the luminance of a flesh-color block has often a concentrated frequency distribution around each of the peaks.

For a capture image having a single peak of the pixel luminance in the flesh-color area and the frequency distribution is concentrated around the peak, the modified luminance value YMave calculated using the expression (1) and the curve L1 becomes almost the same value as the luminance value YMave before modification. This is because of the fact that, in the curve L1, a weighting factor Wy is determined to be a positive (non-zero) value in substantially all the luminance areas including the low-luminance area ZB and the high-luminance area ZA, and the fact that normalization processing using the product of a weighting factor and a frequency distribution is performed in the expression (1) (particularly in the denominator).

Accordingly, it is possible to favorably perform correction even in the case where there are pixels of a flesh-color area of a person only in the low-luminance area ZB by performing correction based on the modified luminance value YMave. That is to say, it is possible to favorably perform correction without changing a method of correction both in the case of the pixel luminance of the flesh-color area having a single peak, and the case of the pixel luminance of the flesh-color area having a plurality of peaks.

Also, the same can be applied to the case where a capture image is a backlit image G2. That is to say, when the brightness of the capture image G2 is corrected such that the average luminance value YMave obtained on the basis of the expression (1) and the curve L2 becomes the correct luminance value, it is possible to favorably perform correction without changing a method of correction even if the pixel luminance of the flesh-color area has a single peak.

2. Second Embodiment

In the above-described first embodiment, an example has been described of the case where when a capture image is determined to be a frontlit image, a calculation is made of the modified luminance value such that a weight on the high-luminance area is set larger than the weight on the low-luminance area, and the modified luminance value is calculated so as to be greater than the average luminance value on the flesh-color area before modification, and the brightness of the capture image is corrected such that the modified luminance becomes a correct luminance value.

Figure 14:
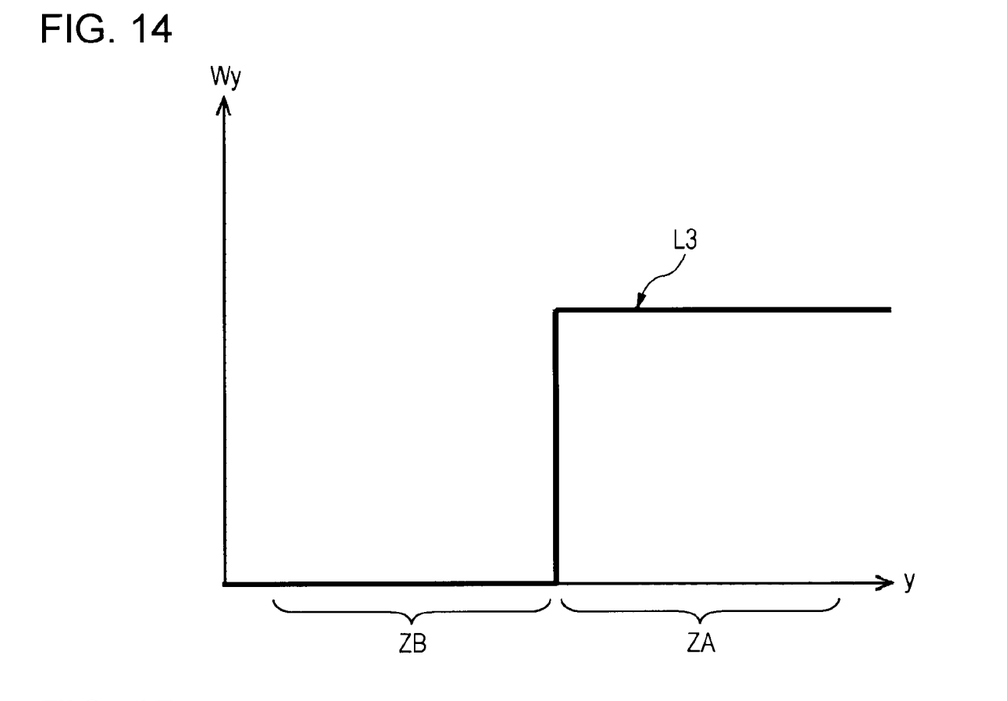
FIG. 14 is a diagram illustrating another example of a weighting curve.

In the second embodiment, an example will be given of the case of extreme weighting. Specifically, when a capture image is determined to be a frontlit image, the modified luminance value is calculated using a weighting curve L3 as shown in FIG. 14 and the expression (1), and the brightness of the capture image is corrected such that the modified luminance becomes correct luminance. In the weighting curve L3, the weighting factor is zero in the low-luminance area ZB, and the weighting factor is a predetermined non-zero value (for example, 1) in the high-luminance area ZA.

This technique is also described as a technique for correcting the brightness of a capture image such that the pixels of the high-luminance area ZA comes to have a correct luminance value when the capture image is determined to be a frontlit image.

By such an embodiment, for a flesh-color area having two luminance peaks, the brightness of the capture image G1 is corrected such that the luminance value YMave modified to be higher than the original average luminance Yave becomes a correct luminance value. Thus, it is possible to prevent a flesh-color area RA (FIG. 5) in a frontlit image from having too much luminance, and to make the flesh-color area RA of the person have correct brightness.

Figure 15:
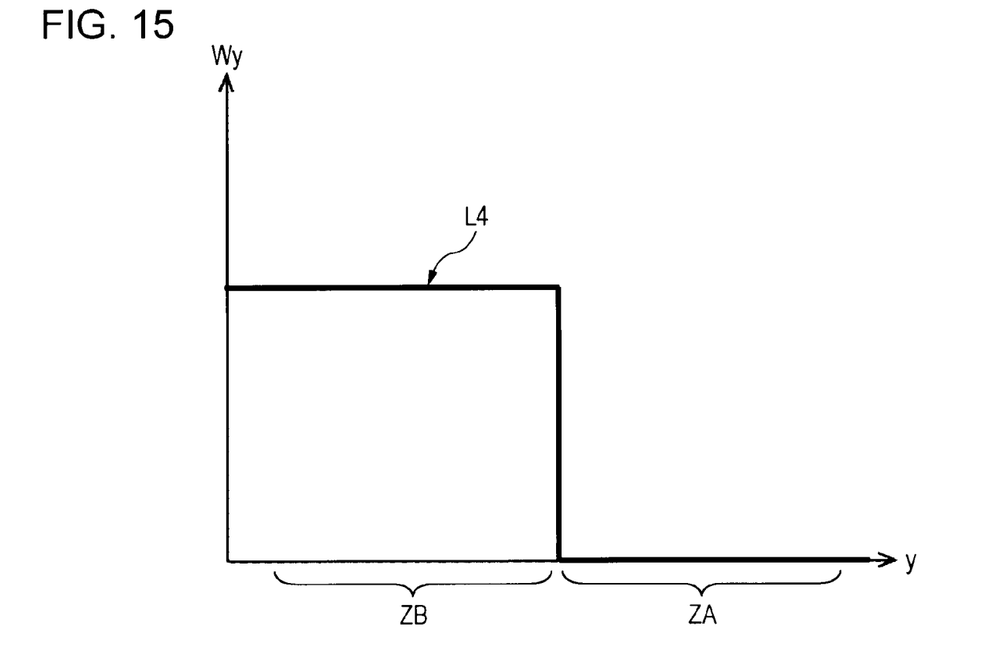
FIG. 15 is a diagram illustrating still another example of a weighting curve.

Also, in the same manner, when a capture image is determined to be a backlit image, the modified luminance value may be calculated using a weighting curve L4 as shown in FIG. 15 and the expression (1), and the brightness of the capture image is corrected such that the modified luminance becomes a correct luminance value. In the weighting curve L4, the weighting factor is a predetermined non-zero value (for example, 1) in the low-luminance area ZB, and the weighting factor is zero in the high-luminance area ZA.

This technique is also described as a technique for correcting the brightness of a capture image such that the pixels of the low-luminance area ZB comes to have a correct luminance value when the capture image is determined to be a backlit image.

By such an embodiment, for a flesh-color area having two luminance peaks, the capture image G2 is subjected to relatively-large brightness correction such that the luminance value YMave modified to be lower than the original average luminance Yave becomes a correct luminance value. Thus, it is possible to correct a flesh-color area RC (FIG. 13) in a backlit image to have sufficient luminance, and to make the flesh-color area of the person have correct brightness.

3. Others

In the above, a description has been given of embodiments of this invention. However, this invention is not limited to the contents described above.

For example, in the first embodiment and the second embodiment, an example has been described of the case of obtaining the modified luminance using weighting. However, the present invention is not limited to this. For example, if it is determined to be in a frontlighting state, the "modified luminance" on a flesh-color area may be obtained as a greater value than the original average pixel on the flesh-color area. Specifically, the "modified luminance" should be obtained by the sum of a setting value in accordance with the degree of frontlighting and the original average pixel value. Next, the brightness of the image G1 may be corrected such that the modified luminance becomes a correct luminance value. By such an embodiment, it is possible to prevent over exposure on the flesh-color area of the image G1 and to correct the brightness appropriately. In this regard, such an embodiment can be stated that if a capture image is determined to be a frontlit image, the brightness of the capture image is corrected such that a high-luminance area having a relatively high luminance value comes closer to a correct luminance value than a low-luminance area having a relatively low luminance among the flesh-color areas.

In the same manner, if it is determined to be in a backlighting state, the "modified luminance" on a flesh-color area may be obtained as a smaller value than the original average pixel on the flesh-color area. Next, the brightness of the image G2 may be corrected such that the modified luminance becomes a correct luminance value. By such an embodiment, it is possible to correct the flesh-color area of the image G2 to be a sufficiently bright area. In this regard, such an embodiment can be stated that if a capture image is determined to be a backlit image, the brightness of the capture image is corrected such that a low-luminance area having a relatively low luminance value comes closer to a correct luminance value than a high-luminance area having a relatively high luminance value among the flesh-color areas.

Also, in the above-described embodiments, the examples have been described of the case where the idea of the present invention is applied to an image processing technique at the time of acquiring a capture image (actual capture image) for recording by the imaging apparatus 1. However, the present invention is not limited to this. For example, the idea of the present invention can be applied to the case of performing image processing using a computer, such as a personal computer, etc., on the image captured by the imaging apparatus 1. Specifically, the programs performing the above-described functions may be executed by a personal computer to correct the brightness of the image captured by the imaging apparatus 1.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    determination means for determining whether a capture image is a frontlit image or a backlit image;
    detecting means for detecting a flesh-color area in the capture image;
    calculation means for setting weights, in a luminance histogram on the flesh-color area, on luminance of pixels included in a high-luminance area having a relatively high luminance value and luminance of pixels included in a low-luminance area having a relatively low luminance value in accordance with a determination result from the determination means, and calculating modified luminance produced by modifying luminance on the flesh-color area on the basis of the weights; and
    correcting means for correcting brightness of the capture image on the basis of the modified luminance, wherein
    after the determination result indicates that the capture image is a frontlit image, the weights are set such that the modified luminance is greater than an average luminance on the flesh-color area before the modification, and
    after the determination result indicates that the capture image is a backlit image, the weights are set such that the modified luminance is less than the average luminance on the flesh-color area before the modification.

2. The imaging apparatus according to claim 1, wherein
    the calculation means calculates the modified luminance after the determination result indicates that the capture image is determined to be a frontlit image such that the weight on the high-luminance area is greater than the weight on the low-luminance area, and
    the correcting means corrects the brightness of the capture image such that the modified luminance becomes a correct luminance value.

3. The imaging apparatus according to claim 1, wherein the correcting means corrects the brightness of the capture image after the determination result indicates that the capture image is determined to be a frontlit image such that pixels in the high-luminance area have a correct luminance value.

4. The imaging apparatus according to claim 1, wherein
    the calculation means calculates the modified luminance after the determination result indicates that the capture image is determined to be a backlit image such that the weight on the high-luminance area is less than the weight on the low-luminance area, and
    the correcting means corrects brightness of the capture image such that the modified luminance becomes a correct luminance value.

5. The imaging apparatus according to claim 1, wherein the correcting means corrects the brightness of the capture image after the determination result indicates that the capture image is determined to be a backlit image such that pixels in the low-luminance area have a correct luminance value.

6. The imaging apparatus according to claim 1, wherein the calculation means changes a degree of the modification of luminance of the flesh-color area in accordance with a degree of frontlighting or backlighting determined by a difference between an average luminance of the brightest area and an average luminance of the darkest area.

7. The imaging apparatus according to claim 1,
    wherein the detecting means detects a flesh-color area included in an AF area having an amount of defocus less than a predetermined value among a plurality of AF areas in the capture image.

8. The imaging apparatus according to claim 1, wherein the modified luminance is an average value of luminance values of the flesh-color area after the weights have been applied to the high-luminance area and low-luminance area.

9. An imaging apparatus comprising:
    determination means for determining whether a capture image is a frontlit image;
    detecting means for detecting a flesh-color area in the capture image; and
    a correction means for calculating a modified luminance by modifying luminance on the flesh-color area on the basis of the weights of a weighting curve on a luminance histogram, and for correcting brightness of the capture image based on the modified luminance after the determination means determines that the capture image is a frontlit image, such that a high-luminance area having a relatively high luminance value comes closer to a correct luminance value than a low-luminance area having a relatively low luminance value among the flesh-color area,
    wherein the weights are set such that the modified luminance is greater than an average luminance on the flesh-color area before the modification.

10. An imaging apparatus comprising:
    determination means for determining whether a capture image is a backlit image;
    detecting means for detecting a flesh-color area in the capture image; and
    a correction means for calculating a modified luminance by modifying luminance on the flesh-color area on the basis of the weights of a weighting curve on a luminance histogram, and for correcting brightness of the capture image based on the modified luminance after the determination means determines that the capture image is a backlit image, such that a low-luminance area having a relatively low luminance value comes closer to a correct luminance value than a high-luminance area having a relatively high luminance value among the flesh-color area,
    wherein the weights are set such that the modified luminance is less than an average luminance on the flesh-color area before the modification.

11. A non-transitory computer readable medium having a computer readable program recorded thereon, the program configured for causing a computer to perform a processing method, the method comprising the steps of:
    a) determining whether a capture image is a frontlit image or a backlit image;
    b) detecting a flesh-color area in the capture image;
    c) setting weights, in a luminance histogram on the flesh-color area, on luminance of pixels included in a high-luminance area having a relatively high luminance value and luminance of pixels included in a low-luminance area having a relatively low luminance value in accordance with a determination result from said step of determining, and calculating modified luminance produced by modifying luminance on the flesh-color area on the basis of the weights; and
    d) correcting brightness of the capture image on the basis of the modified luminance, wherein
    after the determination result indicates that the capture image is a frontlit image, the weights are set such that the modified luminance is greater than an average luminance on the flesh-color area before the modification, and
    after the determination result indicates that the capture image is a backlit image, the weights are set such that the modified luminance is less than the average luminance on the flesh-color area before the modification.

12. A non-transitory computer readable medium having a computer readable program recorded thereon, the program configured for causing a computer to perform a processing method, the method comprising the steps of:
- determining whether a capture image is a frontlit image;
- detecting a flesh-color area in the capture image;
- calculating a modified luminance by modifying luminance on the flesh-color area on the basis of the weights of a weighting curve on a luminance histogram; and
- correcting brightness of the capture image based on the modified luminance after the capture image is determined to be a frontlit image such that a high-luminance area having a relatively high luminance value comes closer to a correct luminance value than a low-luminance area having a relatively low luminance among the flesh-color area,
- wherein the weights are set such that the modified luminance is greater than an average luminance on the flesh-color area before the modification.

13. A non-transitory computer readable medium having a computer readable program recorded thereon, the program configured for causing a computer to perform a processing method, the method comprising the steps of:
- determining whether a capture image is a backlit image;
- detecting a flesh-color area in the capture image;
- calculating a modified luminance by modifying luminance on the flesh-color area on the basis of the weights of a weighting curve on a luminance histogram; and
- correcting brightness of the capture image based on the modified luminance after the capture image is determined to be a backlit image such that a low-luminance area having a relatively low luminance value comes closer to a correct luminance value than a high-luminance area having a relatively high luminance value among the flesh-color area,
- wherein the weights are set such that the modified luminance is less than an average luminance on the flesh-color area before the modification.

14. An imaging apparatus comprising:
- a determination section configured to determine whether a capture image is a frontlit image or a backlit image;
- a detector configured to detect a flesh-color area in the capture image;
- a calculator configured to set weights, in a luminance histogram on the flesh-color area, on luminance of pixels included in a high-luminance area having a relatively high luminance and luminance of pixels included in a low-luminance area having a relatively low luminance value in accordance with a determination result from the determination section, and calculating modified luminance produced by modifying luminance on the flesh-color area on the basis of the weights; and
- a calculator configured to correct brightness of the capture image on the basis of the modified luminance, wherein
- after the determination result indicates that the capture image is a frontlit image, the weights are set such that the modified luminance is greater than an average luminance on the flesh-color area before the modification, and
- after the determination result indicates that the capture image is a backlit image, the weights are set such that the modified luminance is less than the average luminance on the flesh-color area before the modification.

* * * * *